3,325,473
PROCESS OF REFINING ARABINOGALACTAN-CONTAINING COMPOSITIONS AND PRODUCT PRODUCED THEREBY
Ivan Herrick, Mark F. Adams, and Ethan Max Huffaker, Pullman, Wash., assignors to St. Regis Paper Company, New York, N.Y., a corporation of New York
No Drawing. Filed Dec. 21, 1964, Ser. No. 420,105
5 Claims. (Cl. 260—209)

This invention relates to a process for refining arabinogalactan-containing composition and the product produced by such process.

Arabinogalactan is a polysaccharide made up of galactose and arabinose units in the ratio of approximately five or six to one. Arabinogalactan is found in abundance, for example, in the wood of the Western larch tree (*Larix occidentalis*, Nutt). While the arabinogalactan is present throughout the tree, the lower portion of the trunk, referred to as the "butt cut" contains so much arabinogalactan, of the order of 15% to 25% and more of the weight of the dry log, that the butt cut is neither good for lumber nor for pulping purposes. For years this portion of the tree has been discarded and left in the forest.

Various processes have been suggested for extracting arabinogalactan from larch wood with water. These processes are illustrated by: (1) the method described by Acree in United States Patent No. 2,073,616; (2) the method of Wise and Peterson set forth in Industrial and Engineering Chemistry, vol. 22, No. 4, page 362 (1930); (3) the method of Austin described in Journal of the Forest Products Research Society, vol. IV, No. 1, page 7 (1954); and (4) the process invented by Mark F. Adams and described in copending application Ser. No. 258,276, filed on Feb. 13, 1963 and now abandoned. Although the Adams process (number 4 above) is the least objectionable, all of the prior art processes suffer from the fact that not only is arabinogalactan extracted from the wood source, but also materials objectionable for some possible uses of arabinogalactan are removed along with the arabinogalactan.

The major part of these objectionable materials or color or odor imparting substances are phenolic, i.e., aromatic hydroxy in character. A number of these complex phenolic substances have been separated and identified such as taxifolin, aromadendrin, and other tannin and lignin-like materials. Traces of at least three unknown flavanoidic substances have also been detected. These objectionable materials also include very small quantities of esters and terpenes.

Arabinogalactan has been found useful in a variety of applications such as in lithography and in the food and drug industries as an emulsifier, particularly in the preparation of stable, low-viscosity emulsions, and as a bonding agent in pharmaceutical tablets. In such applications in the food and drug industries, arabinogalactan must be essentially non-toxic and preferably free from undesirable color or odor imparting materials particularly those of phenolic character or materials containing iron.

A number of attempts have previously been made to remove associated materials from arabinogalactan-containing compositions. These efforts have included: treatment with various types and kinds of carbon, multiple precipitation with alcohol, use of various types of ion-exchange columns, and electrodialysis. All of these attempts at the refinement of arabinogalactan-containing compositions have met with limited success. Some of these processes have not adequately removed the associated materials, and others have been demonstrated to be uneconomic.

In accordance with the present invention, it was found that arabinogalactan-containing compositions can be refined to obtain substantially pure arabinogalactan essentially free from iron-containing materials and substantially free from phenolic type substances by mixing an aqueous arabinogalactan-containing composition, for example an aqueous larch wood extract, with an active magnesium oxide, digesting said mixture so as to precipitate associated materials (e.g. phenolic and iron-containing substances) from the extract and separating a solution containing substantially pure arabinogalactan from the mixture. This procedure is effective in not only removing substantially all of the phenolic type substances in arabinogalactan-containing compositions, but also in removing essentially all of the iron-containing materials in such compositions. For example, an arabinogalactan-containing extract having from about 70–90 p.p.pm. of iron based on the weight of arabinogalactan will have a concentration, after treatment with active magnesium oxide, of less than 0.5 p.p.m.

The mechanism by which this refining is accomplished is not fully understood. Whatever the mechanism or theory may be, we have found that a substantially pure arabinogalactan essentially free of iron and substantially free of phenolic type constituents can be obtained by our refining procedure.

The magnesium oxides found useful in the practice of this invention are termed here "active" magnesium oxides. The term active magnesium oxide includes magnesium carbonates and/or hydroxides which have been calcined at suitable temperatures not too high so that they retain some water of hydration and some bound carbon dioxide. Commercial grades of magnesium oxide are generally classified into three kinds (a) light or "fluffy," (b) medium or caustic, and (c) dead-burned. Light or fluffy magnesium oxide is a grade of magnesium oxide having a very low bulk density and is produced by calcination at low temperatures so that only from about 5% to 15% by weight of water and carbon dioxide remain. Illustrative of the processes used for making light or fluffy magnesium oxide is that described in United States Department of Commerce, Bureau of Mines, Technical Paper No. 684, entitled, "The Bicarbonate Process For The Production Of Magnesium Oxide" by H. A. Doerner, W. F. Holbrook and O. W. Fortner, dated 1946. Fluffy grade magnesium oxide is the preferred active form of magnesium oxide for use in this invention. The U.S.P. grade, reagent grade, and technical grade magnesium oxide are all suitable. Dead-burned magnesium oxide has not proved to be fully satisfactory. Similarly, dolomite, a natural mixture of calcium carbonate and magnesium carbonate, after calcination, has not been completely effective. Other suitable active magnesium oxides include mixtures of an active magnesium oxide and an inert diluent such as properly (e.g. at 600° C.) calcined weatherer magnesite "flue-dust." Flue-dust in the calcined form contains a mixture of 50% magnesium oxide and 50% inert material. The presence of calcium or other alkaline-earth oxides other than magnesium oxide in the purifying agent would tend to be detrimental.

Any aqueous composition containing arabinogalactan may be refined by the procedure of this invention. The arabinogalactan-containing solution to be treated may be obtained from any source, either extracted from larch wood, expressed from larch wood, or gathered from the tree by hand. Extracts such as those obtained by any of the extraction procedures of Acree, Wise and Peterson, Austin, or Adams, as identified above, may be rendered essentially free from iron and substantially free from phenolic type substances by treatment with an active magnesium oxide. These extractions usually involve steeping larch wood chips in water at an elevated temperature and then separating the extract from the larch wood source. The larch wood extract may be evaporated to dryness and the arabinogalactan-containing solids then remixed with water to form the aqueous composition containing arabinogalactan.

For most efficient use in the practice of this invention, the concentration of arabinogalactan in the mixture to be refined should preferably not exceed about 30% by weight since at higher concentrations the viscosity of the composition may be so high as to present handling difficulties. Also, concentrations of arabinogalactan in the composition above about 30% by weight tend to result in reduced yields of refined arabinogalactan because of increased retention of arabinogalactan in the precipitate formed upon the addition of active magnesium oxide to the composition. In its preferred form, the aqueous composition may contain from about 5% to 25% by weight of arabinogalactan and associated materials.

Magnesium oxide is essentially insoluble in arabinogalactan, or in water, or in the mixture. The amount of active magnesium oxide suitable to effect refining will depend in part upon the amount of arabinogalactan present in the composition to be refined. Generally, the amount of magnesium oxide present should not be less than about 2% based on the weight of total composition of water, arabinogalactan, and associated materials, and preferably should not be less than about 10% by weight. Amounts as high as 15% magnesium oxide have been found suitable. At concentrations less than about 10% the removal of associated substances is not at an optimum since at lower ratios a more slimy precipitate is obtained which is more difficult to filter. However, as the concentration of magnesium oxide is increased above about 10%, more of the arabinogalactan is retained in the precipitate thus reducing efficiency.

Describing the refining procedure more particularly, the active magnesium oxide is mixed with the arabinogalactan-containing composition, the mixture is allowed to digest until a reaction has occurred, and then a solution containing refined arabinogalactan is separated by any convenient means as by filtration from the solid particles. Most of the associated color imparting materials are in the precipitate and the arabinogalactan is in solution. The odor imparting materials may be partially separated from the arabinogalctan by evaporation during the drying procedure or essentially completely separated from the arabinogalactan by treatment with active carbon.

The temperature at which the active magnesium oxide is digested with the arabinogalactan-containing composition may vary from room temperature (i.e about 20° C.) to about 140° C. The time to the reacton point is inversely proportional to the log of the temperature of digestion. At room temperature the digestion would take about four hours or more. At about 100° C., the digestion time is reduced to seconds. Accordingly, it is preferred to conduct the "reaction" at or about boiling temperature. The reaction may be checked visually. When the reaction is essentially complete the active magnesium oxide, which is present as a particulate slurry, appears to flocculate. If the "reaction" temperature is maintained too long the precipitate may become slimy or gelatinous and difficult to filter or separate.

Arabinogalactan-containing aqueous solutions generally are of a pH of about 3 to 4. During treatment with active magnesium oxide, the pH of the composition is raised to between 9 and 10. A pH much above about 11 is to be avoided since some alkaline decomposition of arabinogalactan may result at a higher pH. At a pH of between about 9–10 almost complete separation of iron occurs.

As the "reaction" of digestion continues, a flocculation of the suspended solids is observed and a precipitate is formed containing the associated materials. The essentially refined arabinogalactan can be separated from the precipitate by any of the well-known techniques of which filtration is preferred. Suitable filtration equipment includes rotary vacuum filters or various leaf type filters. The speed of filtration can be improved by the addition of some type of filter aid such as diatomaceous earth, fuller's earth, additional pulverulent active magnesium oxide, or other inert material. The inert material may be mixed with the magnesium carbonate and/or hydroxide prior to calcination to form the diluted active magnesium oxide. The addition of about 2% by weight of magnesium oxide after digestion has been completed has been found particularly useful in obtaining a readily filterable slurry. The precipitate will retain a considerable amount of the refined arabinogalactan which can be partially recovered by washing with water.

The filtrate contains substantially pure arabinogalactan in which up to about 90% of the associated phenolic materials originally present in the technical grade arabinogalactan have been removed and up to about 98% of the iron containing materials have been removed. The filtrate may be evaporated to dryness to obtain the desired refined product. The filtrate may be further decolorized by lowering its pH to about 4 by the addition of an acidic material, preferably a lower aliphatic acid such as acetic acid prior to evaporation of the solvent. Treatment with carbon in an activated form will decolorize and deodorize the filtrate by absorbing the associated color and odor materials. The refined arabinogalactan is non-toxic and useful in the food and drug industries as an emulsifier and as a pharmaceutical carrier or bonding agent. It has also been found particularly suitable as a film former in the preparation of lithographic plates.

Magnesium oxide present in the precipitate can be recovered by low temperature calcination of the precipitate, thereby increasing the efficiency of the process.

The invention is further described in the following examples which are given by way of illustration rather than limitation. In the examples, the term "Tannic Acid Equivalent" (T.A.E.) is repeatedly referred to. Since the major part of the associated materials in the technical grade arabinogalactan or extract are phenolic in character, the degree of refinement of the material can be established by determining the residual phenolic compounds by the Folin-Denis procedure. The Folin-Denis method, briefly, is a colormetric procedure described by D. Folin and W. Denis in the Journal of Biological Chemistry, vol. 22, page 305 (1915), in which the intensity of color produced in the solution is proportional to the amount of phenols, i.e. aromatic hydroxy compounds, in this solution. More specifically, the Folin-Denis procedure is as follows: 2 ml. of a 1% (1 g./100 ml.) solution of the extract is pipetted into a 100 ml. volumetric flask. Folin-Denis reagent (2.5 ml.) is added, followed by 13 ml. of 20% $Na_2CO_3$. The solution is made to volume, allowed to stand for thirty minutes at 30° C. and the absorbency read at 720 millimicrons. A standard curve is prepared for tannic acid using the Folin-Denis procedure, and the respective absorbency reading for each of the solutions is converted to mg. of tannic acid on the basis of this curve.

*Example I*

An aqueous larch wood extract containing 20 parts by weight of technical grade arabinogalactan and 80 parts water was mixed with 1 part by weight of light (fluffy) magnesium oxide. The mixture was heated to near boiling for 7 to 10 minutes. The character of the mixture changed as the heating took place and a flocculent precipitate appeared. When the mixture turned gelatinous, heating was discontinued, and a slurry containing 0.4 part magnesium oxide in water was added, stirred, and the entire mixture was filtered. The solids contained the phenolic substances, iron containing materials, magnesium compounds, and a small amount of retained arabinogalactan. The filtrate contained the refined arabinogalactan essentially free of iron and substantially free of phenolic substances.

Example II

The procedure set forth in Example I was repeated, varying the amount of magnesium oxide used, the temperature of the "reaction" or digestion, and the time of the "reaction" as shown in Table 1 below. The efficiency of the refining process is indicated by the degree of refinement of the product obtained as measured by Tannic Acid Equivalent (T.A.E.). In the table, percent MgO is the percentage of magnesium oxide based on the weight of total arabinogalactan containing solution being treated.

TABLE 1

| Percent MgO | Temperature (° C.) | Time (minutes) | T.A.E. (mg./g. solids) |
|---|---|---|---|
| Untreated | | | 7.6 |
| 1 | 70 | 35 | (¹) |
| 2 | 70 | 45 | 1.52 |
| 3 | 70 | 55 | 1.6 |
| 4 | 70 | 35 | 1.4 |
| 5 | 70 | 30 | 1.41 |
| 10 | 70 | 35 | 1.18 |
| 15 | 70 | 35 | 1.0 |

¹ Not filterable.

Example III

Three different grades of light (fluffy) magnesium oxide were employed using the procedure set forth in Example I. These were: technical grade light magnesium oxide as sold by Michigan Chemical; U.S.P. grade magnesium oxide, and Reagent grade magnesium oxide. All three samples were satisfactory for digestion and filtration and the final T.A.E. value of each of the three samples was 1.08, 1.11, and 1.24, respectively, indicating a high level of refinement.

Example IV

A total of 20 grams of technical grade arabinogalactan obtained by extraction of larch wood chips was added to 100 ml. of water. The solution was warmed and 3 grams of fluffy magnesium oxide was added. The resultant slurry was heated to boiling. The slurry quickly changed appearance to a flocculent precipitate and was filtered while hot. The filtrate was light yellow in color and had a pH of about 9. Addition of a slight amount of acetic acid changed the pH to 4 and the filtrate became essentially colorless. The precipitate was gelatinous and retained considerable water. The precipitate was washed to recover occluded arabinogalactan. About 15 or 16 grams of refined arabinogalactan were recovered by evaporation of the filtrate.

Example V

The physical properties of the final refined arabinogalactan product were studied in order to establish the fact that the material in the filtrate was actually arabinogalactan. A 500 ml. batch of arabinogalactan was prepared in accordance with the procedure of Example I. The final solution contained 15.6% total solids as determined by evaporation of an aliquot of the solution. The refractive index was 1.357, which according to previously established curves for arabinogalactan, would give a value of 15.9% concentration. The viscosity of the solution was determined and found to be 2.48 cps. and the density of the solution at 20° C. was 1.065 g./ml., all of which is in accord with previously established data. The ash content of the dried solids was found to be less than 0.5%. The magnesium oxide content was less than 0.1%.

Example VI

Various magnesium oxide materials were evaluated in accordance with the procedure of Example I, varying only the magnesium oxide containing material used. The efficiency of refinement is recorded as Tannic Acid Equivalent (percent T.A.E.).

TABLE 2

| Ingredient: | T.A.E., (percent) |
|---|---|
| Untreated | 0.76 |
| Fluffy MgO | 0.25 |
| Dead burned MgO | 0.64 |
| $Mg(OH)_2$ | 0.43 |
| Dolomite (uncalcined) | 0.70 |
| Dolomite (calcined, 550° C.) | 0.56 |
| $MgCO_3$ | 0.69 |

The data shows that fluffy magnesium oxide is the most effective in removal of phenolic constituent substances, with the other types of magnesium oxide showing some effect.

Example VII

Larch wood extracts were prepared by the Acree procedure (cited above) using a steam autoclave, by the Wise and Peterson procedure (cited above) at 100° C. and by extracting at 65° C. and at 4° C. The extracts so obtained were reduced to dryness by freeze drying and then the solids were made up to approximately 10% concentration with water. The T.A.E. value was determined on the reconstituted solution and on the same solution after treatment with magnesium oxide. The results obtained are listed in Table 3.

TABLE 3

| | Acree | Wise | 65° C. | 4° C. |
|---|---|---|---|---|
| Percent T.A.E. (untreated) | 4.0 | 4.8 | 3.8 | 1.2 |
| Percent T.A.E. (MgO treated) | 0.61 | 0.66 | 0.29 | 0.13 |

From the foregoing it is apparent that the refining procedure of this invention is useful with any arabinogalactan containing composition.

Example VIII

Two hundred and fifty (250) grams of finely divided larch wood were extracted with 350 ml. of water, by allowing the wood to steep in the water at 4° C., 20° C., 65° C., 100° C., and under steam pressure at 132° C. After temperature treatment, the extract was rapidly removed from the wood by application of pressure in a device similar to a cider press. The final solution obtained ranged from 9.9% to 15.6% arabinogalactan. These solutions were treated with magnesium oxide in accordance with this invention and the following results were obtained.

TABLE 4

| | 4° C. | 20° C. | 65° C. | 100° C. | 132° C. |
|---|---|---|---|---|---|
| Percent T.A.E.¹ | 0.29 | 0.39 | 0.59 | 0.57 | 0.9 |
| Percent T.A.E.² | 0.03 | 0.04 | 0.06 | 0.17 | 0.32 |

¹ Untreated.
² MgO treated.

There is a consistent removal of about 90% of the phenolic substances as determined by T.A.E.; with a decrease in the effectiveness of refining as the temperature of extraction is increased to 100° C. and above.

The refined arabinogalactan resulting from this process has the same viscosity, density, and refractive index as unrefined or "technical grade" arabinogalactan. However, the refined arabinogalactan product has up to 90% less phenolic substances and up to 98% less iron containing materials. Refined arabinogalactan is very soluble in water, insoluble in ether, benzene and acetone, and very slightly soluble (about 0.05%) in ethyl or methyl alcohol. Arabinogalactan is composed essentially of two components, one with an average molecular weight of about 100,000 and the other with an average molecular weight of about 16,000. The distribution of these components in magnesium oxide refined arabinogalactan is from about 65% to 90% of the component having an average molecular weight of 100,000 and about 35% to 10% of the component having an average molecular weight of 16,000. The magnesium oxide refined arabinogalactan has an average molecular weight as determined by the Ostwald viscometer method of about 27,500 and is essentially free of polymeric, relatively high molecular weight lignin-like components.

Various modifications of materials, procedures, conditions, and the like from those described in detail above will suggest themselves to those skilled in the art. The invention is not to be limited except as defined in the claims.

What is claimed is:

1. A process for refining arabinogalactan which comprises mixing an aqueous composition containing arabinogalactan with an active magnesium oxide containing from 5% to 15% by weight of water of hydration and bound carbon dioxide, digesting said mixture at from about 20° C. to about 140° C. so as to flocculate associated materials from said arabinogalactan to leave a solution containing arabinogalactan, and recovering refined arabinogalactan from said solution.

2. A process as defined in claim 1 wherein the digestion temperature is from about 70° C. to about 100° C., and wherein the active magnesium oxide is light magnesium oxide.

3. A process for refining arabinogalactan which comprises mixing an aqueous arabinogalactan solution containing up to 30% by weight of arabinogalactan with from about 2% to 15% by weight of an active magnesium oxide based on the weight of the total aqueous composition at a pH less than about 11, digesting said mixture at an elevated temperature of from about 20° C. to about 140° C., and recovering an aqueous solution containing substantially pure arabinogalactan.

4. A process for refining arabinogalactan as defined in claim 3, wherein the active magnesium oxide is light magnesium oxide.

5. A process for refining arabinogalactan as defined in claim 3, wherein the active magnesium oxide is calcined, weathered magnesite flue dust.

References Cited

UNITED STATES PATENTS

| 1,796,109 | 3/1931 | Kayser et al. | 260—210 |
| 2,110,206 | 3/1938 | Davy | 260—210 |
| 3,089,814 | 5/1963 | Blaich | 260—210 |

OTHER REFERENCES

"Chem. Abst.," vol. 54, 1960, p. 22,386(d–f).
"Chem. Abst.," vol. 55, 1961, pp. 23,356(h)–23,357(f).

LEWIS GOTTS, *Primary Examiner.*

JONNIE R. BROWN, *Assistant Examiner.*